US011865574B2

(12) United States Patent
McCormick et al.

(10) Patent No.: US 11,865,574 B2
(45) Date of Patent: Jan. 9, 2024

(54) POWDER COATING METHOD AND COATED ARTICLE

(71) Applicant: Akzo Nobel Coatings International B.V., Amsterdam (NL)

(72) Inventors: Michael Denis McCormick, Attadale Perth (AU); Oriol Aixala-Marimon, East Fremantle Perth (AU); Frank Zimmermann, Frontenhausen (DE)

(73) Assignee: Akzo Nobel Coatings International B.V., Amsterdam (NL)

( * ) Notice: Subject to any disclaimer, the term of this patent is extended or adjusted under 35 U.S.C. 154(b) by 111 days.

(21) Appl. No.: 16/736,291

(22) Filed: Jan. 7, 2020

(65) Prior Publication Data
US 2020/0139400 A1 May 7, 2020

Related U.S. Application Data

(63) Continuation-in-part of application No. PCT/NL2018/050446, filed on Jul. 6, 2018.

(30) Foreign Application Priority Data

Jul. 7, 2017 (NL) .................................... 2019197

(51) Int. Cl.
| | |
|---|---|
| *B05D 1/12* | (2006.01) |
| *B05D 3/06* | (2006.01) |
| *B05D 5/02* | (2006.01) |
| *B05D 7/06* | (2006.01) |
| *B05D 7/00* | (2006.01) |
| *B27N 7/00* | (2006.01) |
| *C09D 5/03* | (2006.01) |

(52) U.S. Cl.
CPC ............. *B05D 1/12* (2013.01); *B05D 3/067* (2013.01); *B05D 5/02* (2013.01); *B05D 7/06* (2013.01); *B05D 7/542* (2013.01); *B27N 7/005* (2013.01); *C09D 5/03* (2013.01)

(58) Field of Classification Search
CPC . B05D 1/12; B05D 3/067; B05D 5/02; B05D 7/06; B05D 7/542; B05D 2451/00; B05D 3/0254; B05D 5/06; B05D 7/536; B05D 1/06; B27N 7/005; C09D 5/03
See application file for complete search history.

(56) References Cited

U.S. PATENT DOCUMENTS

| | | | |
|---|---|---|---|
| 4,104,416 | A | 8/1978 | Parthasarathy et al. |
| 5,925,698 | A * | 7/1999 | Steckel ................... C09D 5/033 |
| | | | 524/904 |
| 2002/0081393 | A1 | 6/2002 | Kjellqvist et al. |
| 2004/0018109 | A1 * | 1/2004 | Blatter ....................... C08J 3/203 |
| | | | 419/32 |
| 2004/0253373 | A1 | 12/2004 | Langlois |
| 2007/0224352 | A1 | 9/2007 | Stewart |
| 2007/0231580 | A1 | 10/2007 | Holliday et al. |
| 2014/0127417 | A1 | 5/2014 | Chapman |
| 2015/0044476 | A1 | 2/2015 | Decker et al. |

FOREIGN PATENT DOCUMENTS

| | | | |
|---|---|---|---|
| CN | 1416372 | | 5/2003 |
| CN | 101511495 | | 8/2009 |
| CN | 101519546 | | 9/2009 |
| CN | 102209759 | | 10/2011 |
| CN | 103031014 | | 4/2013 |
| CN | 103180398 | | 6/2013 |
| CN | 103372527 | | 10/2013 |
| CN | 104203430 | | 12/2014 |
| CN | 104492670 | | 4/2015 |
| CN | 104893518 | | 9/2015 |
| DE | 3324726 | | 1/1985 |
| DE | 19933095 | | 1/2001 |
| EP | 1092479 | | 4/2001 |
| EP | 1657000 | | 5/2006 |
| FR | 2340140 | | 9/1977 |
| WO | 94/21385 | | 9/1994 |
| WO | 03/033172 | | 4/2003 |
| WO | WO-2005083198 A1 * | 9/2005 | ............... B05D 1/06 |
| WO | 2012059490 | | 5/2012 |
| WO | 2019/009723 | | 1/2019 |

OTHER PUBLICATIONS

"First Office Action," for Chinese Patent Application No. 201880053735.7 dated Oct. 25, 2021 (13 pages) with English.
Jiang, Chunlei "Power Painting and the Workmanship," Furniture, No. 1, pp. 91-94, Jan. 31, 2012 (9 pages) with English Translation.

* cited by examiner

*Primary Examiner* — Nathan L Van Sell
(74) *Attorney, Agent, or Firm* — Pauly, DeVries Smith & Deffner LLC

(57) ABSTRACT

The invention relates to a method of coating an article and to a coated article. A method according to the invention comprises: providing a substrate coated with a first powder coating layer; optionally heating the substrate and first layer so as to at least partially melt or soften the first powder coating layer, wherein said first powder coating layer is not or only partially cured; applying a second powder coating layer on said first layer; and curing said first and second layer.

8 Claims, 6 Drawing Sheets

POWDER COATING METHOD AND COATED ARTICLE

CROSS-REFERENCE TO RELATED APPLICATIONS

This application is a continuation-in-part application of International Patent Application No. PCT/NL2018/050446, titled "POWDER COATING METHOD AND COATED ARTICLE", filed on Jan. 7, 2018, which claims priority to and the benefit of the filing of Netherlands Patent Application No. NL 2019197, entitled "POWDER COATING METHOD AND COATED ARTICLE", filed on Jul. 7, 2017, and the specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

The invention relates to powder coating technology and especially to a method of powder coating an article; as well as to a coated article obtained with such method. More in detail, embodiments are provided for a method of powder coating a heat sensitive substrate (e.g. MDF or wood) with a powder coating composition. The invention in particular allows for obtaining a desirable smooth low gloss finish.

The invention uses a process wherein two powder coating layers are applied. Some prior art documents describe powder coating processes with two powder coating layers, as well. However, these documents do not teach how to achieve a smooth low gloss finish, especially on heat sensitive substrates. Herein, "smooth" refers to how the coating feels, and low gloss to the visual appearance. A coating can also look smooth, i.e. have a uniform appearance. A smooth finish has minimal orange peel finish or even an orange peel free finish.

US 2004/0253373 describes a method of coating a nonconductive plastic substrate comprising the following steps: (a) cleaning the substrate; (b) applying an adhesive/sealer to the substrate; (c) curing said adhesive/sealer by means of heat; (d) applying a thermosetting powder to the hot substrate; and (e) curing the thermosetting powder with heat. The described method leaves scope for improvement for example of the obtained texture.

US 2007/0224352 describes a process wherein a substrate is coated and wherein the first coating is green cured only prior to the application of the second powder coating, for heat sensitive substrates such as MDF. The process uses pulsed heating with plural fixed infrared radiant heat sources. The document is silent about the gloss of the coatings.

US 2014/0127417 describes a method wherein an MDF board is electrostatically coated with epoxy powder and then conveyed through an infrared gel oven to cause the epoxy powder to gel or partially liquefy. The gelled MDF board is subsequently conveyed in about 8 minutes to a top coat booth where the board is coated with another powder. The board is thereafter conveyed to a cure oven where the primer coat and top coat are cured. This document does not describe how to obtain a low gloss coating that is smooth.

Conventional powder coating compositions have for example a softening temperature (Tg or glass transition temperature) of about 40 to 60° C., and a melting temperature (Tm) of about 75 to 110° C., wherein Tm refers to incipient fusion start temperature. Such a composition may for instance cure at a temperature of about 200° C. for at least 10 minutes. Generally, low bake compositions cure at lower temperatures, for example in 3 to 5 minutes at 135-150° C. Conventional powder coatings are not suitable for wood based substrates, because these substrates are heat sensitive, and are liable to e.g. bending, cracking, and outgassing at conventional curing temperatures, which may cause e.g. poor uniformity of the coating layer. Furthermore, fibre rise from wood based substrates, such as MDF, solid wood, and veneered parts, necessitates a pretreatment and/or post treatment such as priming and sanding, before a final finish can be applied or in order for a single coating layer to have good surface quality.

EP 1092479 describes a heat-sensitive substrate which is being coated with a first, low-temperature curing coating powder and a second, high-temperature curing coating powder. The time/temperature conditions of fusing and curing the high-temperature coating powder would damage the substrate if the high-temperature curing coating powder were applied, fused and cured, directly on the substrate. However, the coating provided by the low-temperature curing coating powder protects the substrate from detriment when the high-temperature curing coating powder is fused and cured thereon.

Matting additives such as waxes are known as such, but are generally not suitable for curing at low temperatures, e.g. at less than 130° C. Such additives may also negatively affect mechanical performance, orange peel, scratch resistance, yellowing, brittleness, fingerprint marking and chemical resistance. Other texture additives include PTFE based additives or additives comprising micro particles.

Generally, it is difficult to achieve smooth finishes with low temperature curing powder coating compositions. In view of the generally high reactivity of such coating compositions, the powder coating composition generally has a short time after melting before curing sets in. There is a desire for a method to achieve smooth low gloss finishes, more desirably with minimal orange peel. Desirably, the finish is texture free, i.e. smooth to touch. Desirably, the method is suitable for powder coatings for heat sensitive substrates. The smooth low gloss finish can be referred to as Silky Satin Smooth.

BRIEF SUMMARY OF THE INVENTION

An objective of the present invention is to provide a powder coating method that allows for flexible combinations of texture and gloss.

A further objective is to provide a coated article with a smooth low gloss finish. Desirably, the gloss is uniform over the coated articles, preferably a uniformly low gloss over the entire coated surface of the coated article. Furthermore, the coating is desirably suitable for heat sensitive substrates and/or substrates comprising lignocellulosic material, such as substrates comprising or based on wood, more in particular MDF.

It has surprisingly been found that these objectives can be met at least in part in a two-step process, wherein a second coating layer is applied on the non-cured or not completely cured first coating layer, and wherein the material of the first powder coating layer (e.g. basecoat) is a smooth coating layer material and the material of the second powder coating layer (e.g. topcoat) is a textured powder coating layer material. Preferably, the textured powder coating layer is a fine or micro textured powder coating, most preferably a micro textured powder coating. Both of the coating layers of the present invention are based on low temperature curing powder compositions suitable to be applied on heat-sensitive substrates, i.e. that cure at temperatures that do not damage the heat-sensitive substrate. In general, this means powder coating compositions that cure at temperatures below 150° C., preferably below 140° C., more preferably below 120° C., most preferably below 100° C.

In order to obtain the effects envisaged with the present invention it is important that when applying the second powder coating layer onto the first powder coating layer that the first powder coating layer is malleable and has a non-rigid surface, i.e. is not cured or only partially cured.

Accordingly, the invention relates in a first aspect to a method of powder coating an article, comprising:
 a) providing a substrate coated with a first powder coating layer,
 b) applying a second powder coating layer on said first layer, said first layer being in a non-cured or only partially cured state,
 c) curing said first and second layer,
wherein the material of said first powder coating layer is a smooth powder coating layer material and the material of said second powder coating layer is a textured powder coating layer material.

The invention also pertains to a coated article, comprising a heat sensitive substrate and a powder coating comprising two layers, wherein the powder coating has a gloss value of less than 40 gloss units measured at 60°, and an average roughness Sa of less than 1.50 µm, preferably less than 1.00 µm.

The first powder coating layer may already be in a non-cured or partially cured state when applied onto the surface. In this case the method of the present invention is a so-called dry on dry process which is well known and common practice in powder coatings. Alternatively, the first powder coating layer after being applied to the substrate and before applying the second powder coating layer is brought into a non cured or only partially cured state by heating the first layer so as to at least partially melt or soften the first powder coating layer.

Hence according to an embodiment, the invention relates to a method of powder coating an article, comprising:
 a) providing a substrate coated with a first powder coating layer,
 b) heating the first layer so as to at least partially melt of soften the first powder coating layer, such that said first powder coating layer is not or only partially cured,
 c) applying a second powder coating layer on said first layer,
 d) curing said first and second layer,
wherein the material of said first powder coating layer is a smooth powder coating layer material and the material of said second powder coating layer is a textured powder coating layer material.

Without being limited by way of theory, the material of the second powder coating layer may at least partially sink into the material of the first powder coating layer, thereby reducing or minimalizing the surface roughness of the top surface of the second layer. Hence, in an aspect, the present invention is based on the judicious insight that in embodiments a smooth finish, and preferably a super smooth finish, can be achieved by combining powder coating compositions and process steps, wherein a textured powder coating layer (such as micro textured powder coating layer) becomes (super) smooth when applied on a green cured malleable smooth powder basecoat. This enables a type of finish with the low gloss level which cannot be achieved with known powder coating methods, especially for heat sensitive substrates.

A surface finish can in general be described as either smooth, textured or ripple (the latter one also being referred to as wrinkle). A smooth surface finish can be defined as having a surface substantially free from irregularities, roughness or projections. The texture of the second coating may have varying degrees of roughness which can be determined with a roughness meter measuring properties like the length of the peaks and valleys within the texture Whatever texture/roughness the second layer has, through applying the process of the present invention the finish becomes flat and smooth, so-called Silky Satin Smooth.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

In FIG. 4A, the primer layer does not soften when the top coat is processed and accordingly the final finish is a micro texture. In FIG. 4B, the second red layer seems to melt in the first white layer;

Figure 1:
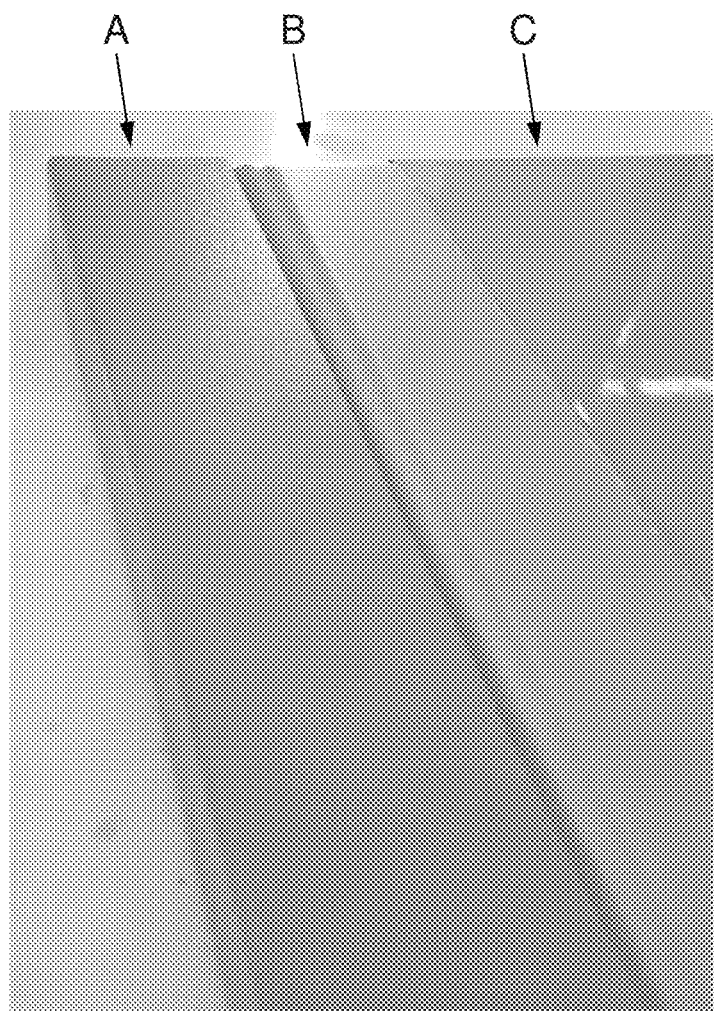
FIG. 1, from left to right, panel A) an MDF part coated with a reference micro texture powder coating, panel B) a coated part according to an example embodiment of the invention, and panel C) a reference coated part with a high gloss coating. The substrates are the same MDF material in parts A-C. In A and B, UV powder coatings are used, in C a different liquid coating is used to illustrate high gloss smooth finish.
Figure 2A:
FIG. 2A-B shows a cut edge with 235× magnification of a reference micro texture coating on a MDF FIG. 2A and of an inventive coating FIG. 2B. Part B shows, from bottom to top, the MDF panel, with the first layer and the red second layer. The top surface of B is flatter than in A.
Figure 2B:
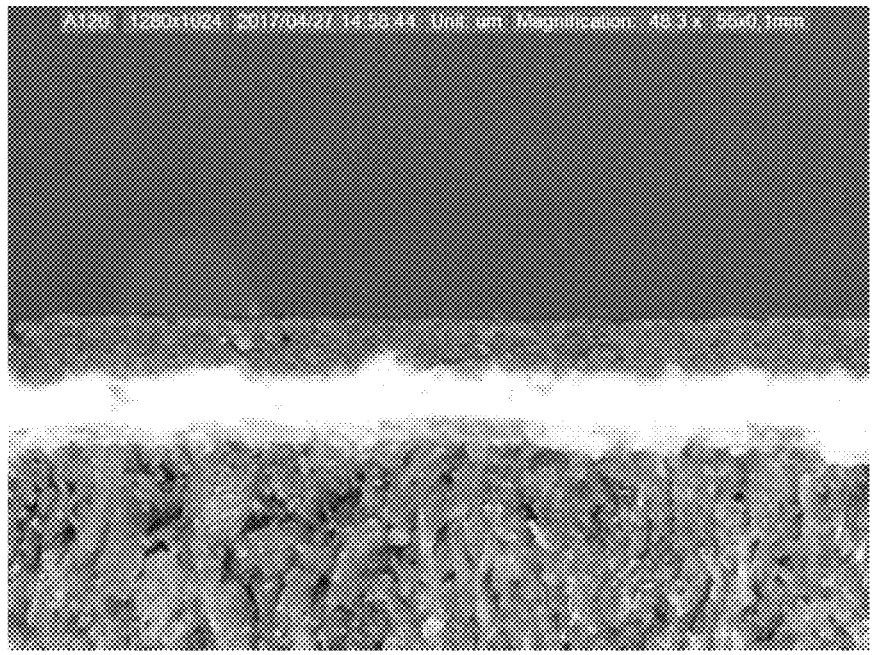
Figure 3A:
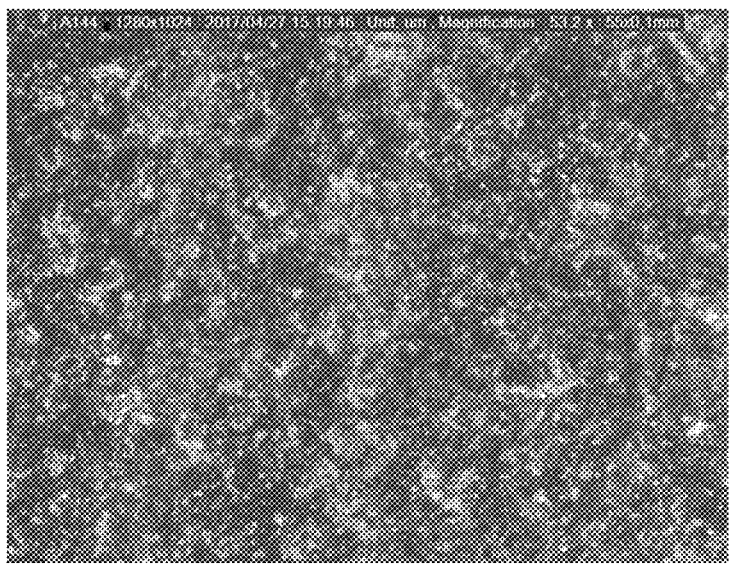
FIG. 3A-C shows 235× magnified pictures of the surfaces with non-polarized light, wherein the reflections are caused by the peaks and valleys of the texture pattern and other irregularities of the surface. Hence, fewer bright spots indicate a smoother finish. A is low gloss, B is according to the invention, C is reference high gloss coating, with the same coated parts as in FIG. 1. This illustrates that part B has higher smoothness than part A. Part C shows the scratches of the sanding and polishing.
Figure 3B:
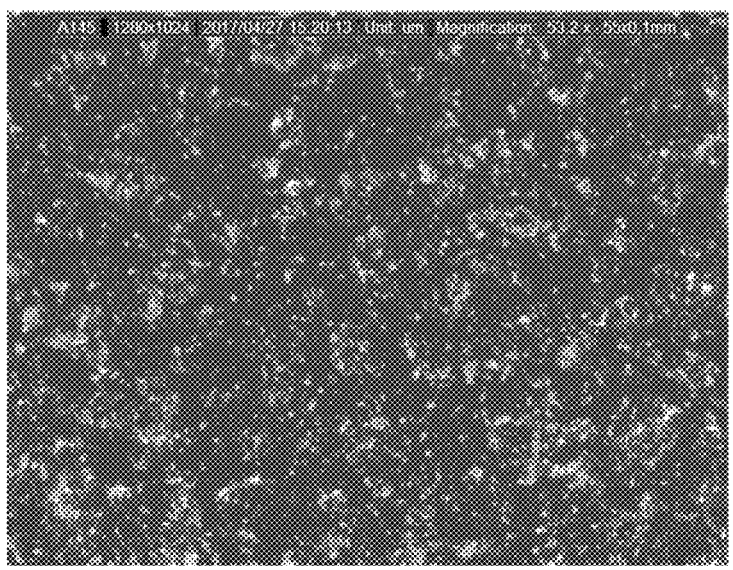
Figure 3C:
Figure 4A:
FIG. 4A-B shows a destructive film build drill hole for A) a reference micro textured UV curable coating on primed MDF and B) an inventive coating. Panel A shows from the center outside the MDF, a layer from liquid thermostable primer, the UV cured micro textured coating, and black marker pen. Panel B shows from center to outside MDF, UV white primer, UV red micro texture coating layer, and black marker pen.
Figure 4B:
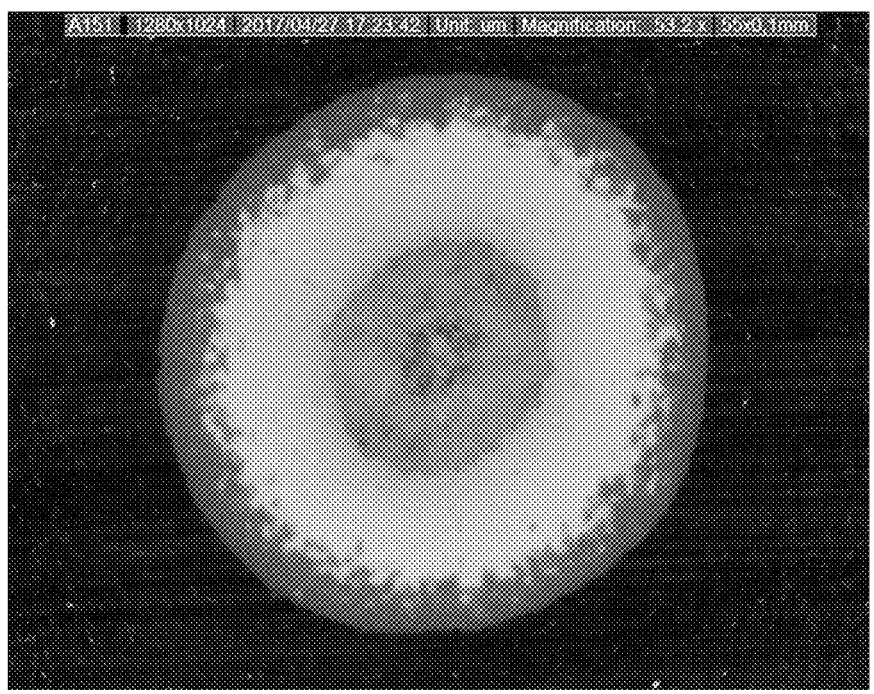

Some exemplary embodiments of the invention will now be further illustrated by the following non-limiting examples.

DETAILED DESCRIPTION OF THE INVENTION

The term "a", "an", and "the" means one or more unless otherwise specified.

The term "UV curable" includes coating compositions which are curable using electromagnetic radiation with a wavelength in the range of 100 to 445 nm, preferable provided by radiation sources with assigned frequencies between 1.5 PHz and 789 THz. More generally, actinic radiation can be used and the curing of UV curable coating layers refers to e.g. actinic initialized polymerization.

The term "ULB" (Ultra Low Bake) curing powder coating compositions is understood as to be based on powder coating types, comprising a thermal initiated or radical initiated thermal curing principle of polymerization reaction.

In the prior art, 50-70% cure advancement is sometimes identified as "green cure" stage for thermally curable coatings. In the present application, green cure can refer to e.g. 0-70% cure, for instance 10-70% or 50-70% cure.

The method according to the invention comprises a step of providing a substrate coated with a first powder coating layer. The substrate may for instance comprise a heat sensitive substrate, e.g. a substrate being liable to chemical and/or physical modifications, such as deformation and/or colour change, at a temperature and times conventionally used in powder coating process, such as at temperatures higher than 180° C., higher than 160° C., or higher than 140° C. for a period of at least 10 minutes, at least 5 minutes, or at least 2 minutes. The substrate may for instance comprise lignocellulosic material. The substrate may for example comprise or consist of wood or a wood fibre based product, such as MDF (Medium Density Fibreboard), or any other type of fibreboard such as HDF (high density fibreboard). The substrate may for instance comprise pressed wood fibres and/or particles and typically a binder resin. The substrate may accordingly for instance also comprise particle board, such as oriented strand board, and plywood. The substrate may also comprise plastic material, e.g. a thermoplastic polymer, such as with a glass transition temperature and/or melt temperature lower than 200° C. or lower than 180° C., or lower than 160° C., or lower than 140° C. The substrate may also comprise e.g. fibre cement, paper faced gypsum, paper foil, or plastic composites. In an interesting embodiment, the substrate is a composite material, for instance a composite comprising such plastic material and a wood based material.

The coated article may for instance be used in residential housing, commercial buildings, office partitioning, joinery, ceiling panels, retail fit-out and marine fit-out, e.g. in ships. The coated article can for instance be furniture, e.g. in assembled form or flat pack. The coated articles are for example furniture parts.

The powder coating compositions of this embodiment are typically suitable for outdoor and/or indoor applications.

To allow proper powder coating deposition while electrostatic spraying, the resistance of the substrate or at least the surface of the substrate is typically lower than $10^{11}\Omega$.

The substrate can for example have great variety of shapes in 2D and 3D geometry, for instance a board or beam, box shaped pieces, acoustical boards, frames, cut and routed parts or combination of these. The substrate has for instance a flat or curved surface to be coated.

The substrate is coated with a first powder coating layer. In an embodiment, the substrate is provided as substrate coated with such a first layer in a prior step. The method may optionally also comprise a step of coating a substrate with a first powder coating layer, and optionally a pre-treatment step. Pre-treatment steps are for example application of a conductive primer, sealer, smoothing (e.g. thermo smoothing) and special deionized air brush cleaning. The substrate is optionally pre-heated to assist with uniform powder application. The optional preheating comprises for instance heating by one or more selected from infrared radiation, electric heating, gas infrared heating, and convection. The first powder coating layer is generally applied with electrostatic spraying.

The process may comprise a step of heating the first layer so as to at least partially melt or soften the first powder coating layer, wherein said first powder coating layer is not or only partially cured. For instance, the substrate and the first layer are heated. The heating step may for instance comprise heating with convection and/or infrared (IR) heating, advantageously with a combination of both. In this step, the first powder coating composition is typically melted, levelled, and optionally partially cured. The heating is generally to a temperature above the glass transition temperature ($T_g$) and/or above the melting temperature ($T_m$) of the first powder coating composition. Tg is for example measured using Differential Scanning calorimetry according to e.g. ASTM E1356, e.g. the midpoint of the temperature range bounded by the tangents to the flat regions of the DSC heat flow (J/s) curve. Tm is for example the endothermic peak in the DSC heat flow curve where the melting is characterized with. In DSC analysis also any exothermic values generated by remaining reactive potentials can be detected. By running a heating rate of e.g. 5 K per minute in a first run, starting with e.g. 40° C. until requested curing temperature, Tc (e.g. 145° C.), is reached, the powder coating composition will be full cured during the measurement. The exothermic energy value (mJ/g) generated by the chemical reaction can be read at the peak of the curve. Cooling down the sample and run a second time with 5 K per minute through the same cycle until no exothermic reaction peak can be detected anymore, means the system got full cured.

Any partial pre-curing, that may happen during Green Curing melting process, can be detected by calculating the difference between fully cured exothermic value and exothermic value of the measured coating. This method allows for determining and quantifying partial curing.

In case of a thermally curable first powder composition, the heating is preferably to a temperature lower than the curing temperature, e.g. at least 5° C. lower than the curing temperature, and/or preferably for such a short time above the curing temperature Tc that no, or only partial curing is obtained before the second powder coating layer is applied. For instance, the first layer is subjected to a temperature higher than (Tc−5° C.) for less than 10 minutes, or less than 2 minutes, before the second layer material is applied on the substrate. Preferably, the first coating layer forms a film during this step, more preferably a uniform film. Preferably, the first powder coating at least partially melts and/or softens during this stage, e.g. so as to give a liquefied and/or gelled layer. Preferably, the heating is to a temperature of at least 75° C., at least 95° C. or at least 120° C., or at least 135° C. for a period of at least 10 seconds, at least 30 seconds, at least 1 minute, or at least 5 minutes.

During this step, the first layer is not cured, or is only partially cured. This gives a so-called "Green Cured" article. For instance, if partial cure occurs during this step, the partial curing is to less than 80%, less than 70%, less than 20% or less than 10% or less than 5% or less than 1% of the full or final cure, measured in e.g. the number of reacted functional groups. For instance, the number average molecular weight of the first powder coating composition is, at the time the second powder coating layer is applied, less than 200% or less than 150% of the initial number average molecular weight. For ULB (Ultra Low Bake) first layers, DSC (Differential Scanning calorimetry) can be used for obtaining exothermic values as an equivalent to any remaining curing potential. For UV coatings not irradiated with UV light, the curing can be assumed to be 0% or in any case less than 10%.

The embodiment wherein a Green Cured first layer (Basecoat) is re-coated with the second layer (Topcoat) according to the invention provides for good intercoat adhesion between both layers. The quality of intercoat adhesion can be measured with e.g. a Cross Hatch test according to DIN EN ISO 2409. Results with no delamination between the both layers can be obtained and indicate the best value of intercoat adhesion.

The first layer preferably has a thickness of 10-200 μm, for instance of 50-90 μm. The powder composition is for instance an Ultra Low Bake (ULB) or UV curable powder coating composition.

Advantageously, the method of the invention may avoid an abrasive surface treatment step, such as avoiding a sanding step. This is especially advantageous for wood based substrates, e.g. for substrates comprising wood fibres, and for other types of substrates containing fibres providing at least part of the surface to be coated. Hence, in a preferred embodiment the substrate before applying the coating exhibits fibre rise. In the coated article, fibre rise may be prevented at least in part by the coating. Also, for such substrate, the method optionally does not comprise sanding.

Furthermore, advantageously a primer (sealer) is not necessary and the first powder coating layer is preferably applied directly on the substrate. In this way, a very efficient coating method is provided which may advantageously involve fewer steps than known powder coating processes for e.g. heat sensitive substrates. In a preferred embodiment, the total process time from applying the first coating layer to the full cure of the first and second layer is less than 30 minutes, less than 20 minutes, or less than 10 minutes.

The method of the present invention comprises a step of applying a second powder coating layer (topcoat) on the first layer (basecoat). The second powder coating layer is typically applied using electrostatic spraying, using a triboelectric or high voltage charging spraying device, such as a spraying gun. The second layer is for instance applied when the first layer has a temperature of 10-70° C., or at 15-50° C., for example at ambient temperature, such as 15-30° C., or 18-25° C., preferably with 40-45% relative humidity. The present invention in particular relates to powder coating compositions which are applied as free-flowing, dry powder. The powder coating compositions are generally applied without a solvent. This applies for applying the second layer and for the optional step of applying the first layer.

Between the heating stage, in particular the melting of the basecoat, and the step of applying the second coating layer, the parts to be cured can for instance be stored. Hence, optionally the green cured parts are stored. This advantageously may allow for carrying out the method with limited equipment, such as with a single spray booth and/or a single oven.

Advantageously, in some embodiments remaining heat activation of the surface (e.g. higher temperature) from the heating step of the first layer enables electrostatic powder deposition of the second layer. This may allow for omitting a preheating unit for the second powder application step.

Furthermore, advantageously in a preferred embodiment the method is carried out in a production line, with separate runs for the first and second layer, wherein different line speeds can be used in these runs. This reduces total process time and energy.

The method furthermore comprises a step of curing the first (basecoat) and second layer (topcoat), after the second layer is applied on the first layer and substrate. Hence, the full cure is achieved for the substrate on which both the first and the second powder coating layer are applied. The curing step may comprise thermal curing, e.g. with a temperature of 100-140° C. for at least 5 minutes, e.g. 5-15 minutes or 5-10 minutes, or with UV light (e.g. exposure to electromagnetic radiation with a wavelength in the range of 110-445 nm). A possible curing cycle for a low bake or Ultra Low Bake coating layer is for instance at 130–135° C. for 5-10 minutes. The curing stage for instance comprises melting, flowing and complete curing of both layers that are applied.

UV curable powder coatings advantageously allow for a good separation of melting and curing, because for such compositions, melting (and softening) depends on temperature whereas curing requires UV light. Hence, in the step of heating to at least partially melt of soften the first powder coating layer, generally UV light is not applied or is avoided. UV curable powder coatings also allow for low processing temperatures. Furthermore, UV crosslinking (i.e. curing) yields a coating that can have an advantageous combination of high crosslinking, high hardness and chemical resistance.

A possible curing cycle for UV powder coatings according to said embodiment of the invention comprises for instance for the first (basecoat) layer 0.3-3 minutes melting typically at a temperature below 120° C., below 100° C., below 85° C., or below 75° C., to obtain a molten and formed film on a substrate and subsequently for the applied second layer (topcoat) 0.3-10 minutes, more preferable 0.3-5 minutes, or more preferable 0.3-2 minutes melting, typically at a temperature below 120° C., or below 100° C., or below 85° C., or below 75° C., with subsequent exposure to UV light in a range of 100-445 nm, preferably using defined radiation sources with assigned frequency between 1.5 PHz and 789 THz.

In an embodiment of the invention, a Silky Satin Smooth surface aspect is provided. In an embodiment, the coating is provided with gloss values of lower than 50 GU, lower than 40 GU, or lower than 30 GU. Such low gloss values can be obtained by modification of used powder coatings in terms of e.g. melting viscosity for the basecoats and e.g. of used texture type for topcoats. The gloss value can be measured with a glossmeter e.g. according ISO 2813:2014, wherein gloss values (in GU—gloss units) at 60° angle geometry are applied.

In the present invention, the first layer (basecoat) is a smooth powder coating layer of a material which preferably has a gloss value about at least 15 GU higher, at least 30 GU higher, or even at least 50 GU higher than the second layer (topcoat) powder coating material applied as single layer. The second layer (topcoat) is a textured powder coating layer wherein the gloss value is generally controlled by the type of texturing agent used in said second layer. Due to the combination of layers in the coating of the present invention, the actual gloss value of the second layer can differ from the specified gloss value of the powder coating formulation of the second layer, i.e. for the layer alone without first layer. This can advantageously be used for adjusting the gloss value of the coating. The combination of a smooth powder coating first layer and a textured powder coating second layer is required to developed the said Silky Satin Smooth surface aspect, which is a preferred embodiment of the present invention.

The material of the first smooth coating layer for instance may comprise flow agents (also referred to as extenders). Flow agents are rheology modifiers that decrease the melting viscosity of the powder coating formulation and reduce the surface tension of the melt, allowing it to flow and extend on the surface. Examples of suitable flow agents include but are not limited to polyacrylates absorbed on silicon dioxide, amide modified polyether oligomers and flow promoter masterbatches. These flow agents are typically used in amounts varying between 0.1 and 10% by weight based on the weight of the total powder coating formulation. Some coating formulations may not require the use of flow agents in order to achieve a defect free (no craters, no fisheyes, etc.) smooth finish.

Current techniques in formulating textured powder coatings require balancing particle size, resin-viscosity and filler loadings to restrict the melt flow of the material thereby causing a coating surface with various degrees of orange peel or texture. Therefore, the material of the second texture coating layer may comprise a texturing agent. Texturing agents act as rheology modifiers, increasing the viscosity of the powder coating formulation and creating a shrinking effect on the powder coating resulting into a textured finish. Typically, a texturing effect might be achieved by the use of such texturing agents like polytetrafluoroethylene (PTFE), polyethylene, combinations of both and/or fillers. A texturing agent typically comprises particles, such as particles having a particle size different than the particles of the powder coating. Such texturing agent consists typically of particles with a controlled classification of its particle size distribution. Furthermore, those agents can be based on organic or inorganic material or combination thereof and are characterised by having a softening or melting point of at least two times higher, preferably at least 1.5 times higher, than the melting temperature range that the powder coating process requires. Such texturing agents typically comprise a range of particle size distribution between 1 and 250 μm, preferably classified between 1 and 150 μm, more preferably classified between 1 and 100 μm, even more preferably classified between 1 and 50 μm or 1 to 25 μm. Typical particles have a spherical or anisotropic structure. Embedded in a film building binder matrix the provide a finish called texture or micro texture surface aspect. Typical content of texturing agents is within the range 0.1 to 30% by weight based on the total weight of the powder coating formulation. Generally, higher texturing agent content will provide rougher texture finish and lower gloss levels. Other factors that influence the type of texture are the shape of said texturing additives (spherical or anisotropic) and its classification in particle size distribution ranges, the particle size of the powder and the means of powder application such as voltage and amperage. Optionally, the second layer is a micro texture powder composition.

The combination of flow agents in the first layer and one or more texturing agents in the second layer contributes to the smooth low gloss finish. In some embodiments, the material of the second layer comprises flow agent in a lower concentration (on weight basis) than in the first layer, preferably with an at least 50% lower concentration flow agent than in the first later. Preferably, the material of the first layer comprises no texturing agent, or at least in a lower concentration (on weight basis) than in the second layer, preferably with an at least 50% lower concentration.

The gloss of the finish is controlled by the gloss of the second texture powder coating layer. Typically, the rougher a texture powder coating is, the lower the gloss and the more matt the finish will be. Optimal results of said Silky Satin Smooth finish are achieved when the second layer is a micro texture powder composition.

Examples of thermally curable powder coating compositions, such as ULB coating compositions, for the first and/or second coating layer include systems based on radical initiated thermally curable powder coating systems. Examples are unsaturated polyester, vinylether-urethane polymers and peroxide compositions. Also possible are thermally curable resin compositions such as —COOH functional (carboxylic) saturated/unsaturated polyester resins with epoxy groups. These can be for instance from bisphenol, e.g. bisphenol-A, based epoxy resins, suitably with Mn (number average molecular weight) of at least 1000, preferably between 1000 and 4000. For instance, a thermal radical curing powder coating composition can be used, such as comprising a peroxide initiator.

Examples of actinic radiation curable, e.g. UV curable, powder coating compositions include systems that contain as a binder unsaturated resins, such as unsaturated (meth)acrylates resins, unsaturated allyl resins, unsaturated vinyl resin. Also possible are for example acrylated epoxies, acrylated aliphatic or aromatic urethane oligomers, acrylated polyester or acrylic oligomers, semi-crystalline or amorphous polyesters. The UV curable composition preferably contains a photoinitiator. Optionally, the composition contains a radical initiator (such as peroxides and azo-bis-isobutyronitryl), and additives such as flow agents, defoamers, wetting agents, slip aids and other coating additives. Also possible are polytetrafluoroethylene (PTFE) additives for improved robustness and scratch resistance, especially for the second coating layer. Flow agents are known as such in the art. Examples are polyacrylates e.g. adsorbed on a silicon dioxide support or with a binder resin, and (cellulose) esters compounds.

Preferably, the material of the first layer (basecoat) comprises a powder coating formulation with crystalline resins. Such crystalline resins often have a low viscosity of the melted resin, which is advantageous for ensuring that the material of the second layer can at least partially sink into the first layer during the coating process.

The first and/or second powder coating composition for example has a melting viscosity at 90° C. of lower than 1200 Pa·s, or lower than 1000 Pa·s, or even lower than 800 Pa·s. Such low melting viscosities are used for example for a powder coating composition formulated to be used for horizontal application.

The first and/or second powder coating composition may also a melting viscosity at 90° C. of at least 1200 Pa·s, or at least 2000 Pa·s, or more preferably higher than 3500 Pa·s. The powder compositions can also have a melting viscosity in a range of at least 1000 Pa·s to 2500 Pa·s, or 900 Pa·s to 1800 Pa·s at 100° C. melting temperature. Such viscosities are used for example for powder coating compositions formulated to be used for vertical application. These viscosities can be measured according ISO 2884-1, rotary viscometer (preferred method) or cone-plate-viscometer, for a melt from uncured powder.

The first and/or second powder coating compositions have for example a particle size in the range of 2 µm to 100 µm, or at least a range of 2 µm to 80 µm.

The first and/or second powder coating compositions optionally comprise pigments. The coating can be formulated for instance as a clear coat, without pigment, for instance for indoor and outdoor application. Low gloss clear coat powder coating compositions can for instance be used to protect the substrate and/or to avoid unwanted specular reflections from the substrate. The coating can be formulated for indoor use and/or for outdoor use.

Preferably, the second powder coating layer is UV curable, and wherein said curing step involves irradiation of the article with UV light for curing the second powder coating layer. Preferably, both the first and second powder coating layers are UV curable, and wherein said curing step involves irradiation of the article with UV light for curing the first and second powder coating layer, and wherein the first powder coating layer is not cured until after the second powder coating layer is applied, and typically is melted and cured.

Advantageously, to get the Silky Satin Smooth surface effect with optimal results, in particular a regular and consistent finish, the UV curing can be independent of the temperature for a UV curable coating layer, and hence can be independent from the melting temperature of the powder coating composition when exposed to UV irradiation.

Advantageously, the method allows to generate the Silky Satin Smooth surface effect in a very homogeneously way across the whole surface. In particular, the method can work independent of the radiation angle, i.e. the angle between UV irradiation source used for curing and the surface. Care is taken that the UV dose reaches the minimum value for full cure of the UV powder coating composition. This is especially advantageous for substrates with curved, routed or angled surfaces to be coated.

The method also works and gives Silky Satin Smooth surface aspects independent of the type of UV radiation source and emitted UV specific wave length spectrum used, provided that the total UV dose ensures full cure of the coating.

Also, for UV curable coating layers, e.g. a UV curable second layer, the coating process may comprise melting the powder coating composition, e.g. at a temperature of at least 50° C., at least 60° C., at least 70° C., at least 80° C., such as 80-90° C. The melting and curing step can be separated for UV curable powder coating compositions, especially because the temperature does not initiate crosslinking but contributes to melting and film forming. Preferably, the substrate with molten UV curable coating layer enters a UV irradiation zone at such a temperature, that the radical reactive groups of the used polymers have enough mobility to polymerize properly. Furthermore, advantageously the processing time for UV curing is generally much shorter than for ULB powder coating layers.

Advantageously, the homogeneity of the Silky Satin Smooth surface effect is neither depending on layer thickness of the first layer applied nor on the film thickness of the second layer applied, as long as both the first and the second layer have at least a preferred applied film thickness of 40 µm, or more preferable of 50 µm each.

Preferably, the material of the second powder coating layer at least partly penetrates into the first layer when both are in melted form. Preferably, the second layer is applied, heated and cured in such a way that the first layer is soft at some stage from applying the second layer to curing the second layer. Preferably, the method allows for a part of the second layer to "sink" in the first layer.

Preferably, a mixing layer is formed wherein the first and second layer are mixed, wherein the thickness of the mixing layer is at least 1.0 µm, at least 2.0 µm, at least 5 µm or at least 10 µm. In the mixing layer, preferably the fraction of the first layer is 10-90%, preferably 30-70% by volume (e.g. measured as area in cross section) of the layer. The upper and lower limit of the mixing layer, in the thickness of the coating, is given by the layers from which the fraction of the first layer is more than 90% (at the bottom) and less than 10% (at the top, hence into the second layer), for example as measured in cross section of the thickness of the coating, and over a section of at least 1 mm or at least 2 mm parallel to the substrate. Preferably, a mixing layer is formed wherein the first and second layer are mixed, between two unmixed layers, wherein in the mixing layer for each line segment of at least 1 mm parallel to the substrate, the fraction of the line segment going through the material of the first layer is 10-90%, preferably, 30-70%, and wherein in each of the unmixed layers, the fraction of such line segment going through the first powder coating material is at least 90% for the bottom unmixed layer and less than 10% for the top unmixed layer. In these cases, the first and second powder coating compositions have different compositions.

In a preferred embodiment, the first layer is heated to a temperature of below 140° C., preferably below 100° C., to melt the particles of the powder coating composition without curing the particles. In the curing step, the substrate including the first and second layers is heated to a temperature of below 140° C., preferably below 100° C. or subjected to UV irradiation to obtain a coating that has a smooth surface. Preferably, the gloss of the obtained coating is adjusted by means of selecting the type of powder coating particles used in the second layer. For instance, the gloss and texture of the second layer can be adjusted. The gloss of the coating can for example be increased by using a finer powder for the topcoat and/or a topcoat material with a higher gloss value. For example, the top coat material can contain a PTFE additive, in particular a PTFE additive containing PTFE particles and a coating shell of the particles. In some embodiments, both the first and the second layer material are ULB powder coating compositions. In other embodiments, both the first and the second layer material are UV powder coating compositions.

In sum, a Silky Satin Smooth surface aspect can be achieved in embodiments of the invention, in particular with UV powder coating compositions. Preferably the first layer or basecoat (or primer) is "Green cured", and the second layer (topcoat) is applied, and a full cure of the both layers preferably gives a smooth low gloss finish, so called Silky Satin Smooth surface aspect.

More preferably, such a smooth (e.g. low surface roughness) and low gloss finish is obtained for a heat sensitive substrate, in particular if the first and second layer are both UV curable, because the total process temperature can be operated at much lower temperature value. Preferably, the first layer (i.e. basecoat) smooth with low viscosity, and preferably, the second layer (or topcoat) is textured. Preferably, the so coated article has no or low orange peel. Minimal orange peel indicates a smooth surface.

Advantageously, the method of the invention allows for avoiding the use of solvents, high utilization of paint material, and for a simple coating process. Compared to known UV powder coating processes, a drastic reduced or even eliminated orange peel of the surface can be achieved.

Advantageously, the method of the invention may eliminate any necessary pre-treatment of substrates that are showing fibre rise effects when a coating has got applied.

Compared to known ULB powder coating processes, low orange peel can be achieved.

Moreover, articles for indoor as well as for outdoor use can be coated with the inventive method.

Generally, it is an advantage compared to liquid coatings, that powder coating can deliver a high film build in a single application, e.g. of 100 μm to 200 μm, while still achieving good through-cure. Furthermore, the powder coating allows for a preferred embodiment wherein the first and/or second powder coating layer are applied to a surface, in particular to a vertically orientated flat panel (with respect to gravity), more preferably to both sides of such a panel, in a single step. Additionally, the process of the invention allows for applying the powder coating layers to horizontal surfaces, e.g. of panels.

Generally, embodiments allow for coating heat sensitive substrates with a highly advanced and sustainable application method and with environmental future driven coating materials.

The coating method advantageously involves curing at relatively low temperatures, and is suitable especially for MDF and wood. The method can give a matt or a satin surface, depending on the choice of the type of powder coating composition used in the second coating layer. The second powder coating composition suitably is a textured coating composition so as to give a low gloss surface. Preferably, the coating of the invention is silky satin-smooth, and combines low surface roughness with low gloss. Advantageously, the obtained powder coating can have an extremely regular matting effect, especially if the first and/or second layers are UV curable, e.g. the surface is uniformly matte such as without any higher gloss parts or spots. The method may also provide for regular matting with advantageously consistent and repeatable matte surfaces.

Advantageously, the coating method of the invention can be applied independently from the layer thickness applied, preferably the first layer is 5-200 μm, more preferably 50-70 μm, and the second layer is preferably 5-200 μm, more preferably 50-100 μm thick, when applied, such as for example for a UV curable first and/or second coating layer and for a ULB first and/or second coating layer.

Preferably, the coated article has a matte surface, e.g. with a gloss of 30 gloss units or less, or 20 gloss units or less, such as 15-30 gloss units, measured at 60° using a gloss meter, according to ISO 2813:2014 and/or DIN 67530, the first method being preferred. The coated article can for instance also have a semi gloss finish with 30 to 50 gloss units measured at 60°.

Preferably, a smooth surface aspect is obtained. Accordingly, the first and/or second powder coating compositions preferably have amorphous polymer characteristics when cured.

Furthermore, the method advantageously allows for efficient stock of coating components, i.e. less stock, by using separate compositions for the two layers. The colour matching process between fine texture coatings and smooth coatings can also be simplified. Advantageously, the risk of cross-contamination in a production line can be low when changes of products from smooth to fine texture are requested, due to the flexibility of the coating method that allows for adjusting the desired gloss. In particular, the same binder base can be used for the powder coating compositions of the first and second layer.

Additionally, the invention pertains to a method of powder coating an article, comprising: providing a substrate coated with a first powder coating layer; optionally heating the first layer so as to at least partially melt or soften the first powder coating layer, such that said first powder coating layer is not or only partially cured; applying a second powder coating layer on said first layer which is not or only partially cured; curing said first and second layer, wherein the material of said first powder coating layer comprises a flow agent and the material of said second powder coating layer comprises a texturing agent.

The invention also provides a coated article, preferably obtainable with a method as described. The coated article preferably comprises a heat sensitive substrate, and comprises a powder coating comprising two layers. The powder coating preferably has a low gloss and smooth surface. Preferably the coated article has a Silky Satin Smooth surface aspect as described. For example, the powder coating has a low gloss of less than 40 gloss units, or less than 30 gloss units, or less than 20 gloss units measured at 60°. Preferably the surface is smooth, and accordingly the surface roughness is relatively low. For instance, a coated article with Sa (average roughness) of less than 1.50 μm or less than 1.20 μm or even less than 1.00 μm, and for example more than 0.50 μm can be prepared, and preferably with Sq (root mean square roughness) of less than 1.50 μm, less than 1.30 μm or less than 1.20 μm, and for instance more than 0.50 Sa and Sq are as measured according to ISO 25178, using e.g. widefield confocal microscopy. Alternatively, and/or in combination, the coating has a Ra of less than 5.0 μm, or less than 2 μm, or less than 1.50 μm. Preferably, the coating has a Rz of less than 10 μm, or less than 6.0 μm. Preferably, the coating has Rq of less than 5.0 μm or less than 2 μm. Herein Ra is the roughness average; Rz is the ISO ten point height measurement, and Rq is the root mean scare roughness, all according to ISO 4287 and measured e.g. according to ISO 4288.

The two layers are in interfacing contact, i.e. have an interface between them. The coating comprises a mixing layer, preferably as described. The thickness of the mixing layer is at least 1.0 μm, at least 2.0 μm, at least 5 μm or at least 10 μm. Preferably, the interface is wavy, such that in cross section the interface line has a length of at least 1.1, or at least 1.2 times the corresponding length of the top surface, in said cross section over the thickness of the coating.

The substrate is preferably as described and more preferably comprises MDF.

FIG. 1 shows, from left to right, A) an MDF part coated with a reference micro texture powder coating, B) a coated part according to an example embodiment of the invention, and C) a reference coated part with a high gloss coating. The substrates are the same MDF material in parts A-C. In A and B, UV powder coatings are used, in C a different liquid coating is used to illustrate high gloss smooth finish. In inventive coated element B, the top coat has the same composition as reference element A. However, in element A the coating is applied directly on the substrate, whereas in coated element B, the coating is applied in a two step process according to the invention with a UV curable with primer powder coating layer;

Example 1

A coated article A was prepared according to the invention, and a comparative coated article B with a single layer fine texture coating. The powder composition for B was the same as for the second layer topcoat of A. The results are shown in table 1. The roughness of coated article A is about 30% of that for comparative coated article B.

TABLE 1

|  | Film build of the layer | Gloss (at 60°) | Ra (μm) | Rz (μm) | Rq (μm) |
| --- | --- | --- | --- | --- | --- |
| A | 80 μm | 30 | 1.06 | 5.08 | 1.33 |
| B (comparative) | 80 μm | 23 | 3.15 | 17.42 | 3.89 |

Example 2

A coated article A was prepared according to the invention with a first layer and a second layer, both UV curable. A comparative coated article B was also prepared with a single layer micro texture UV curable powder coating. The powder composition for B was the same as for the second layer topcoat of A. Surface texture properties were determined using widefield confocal microscopy using a Carl Zeiss Smartproof 5 confocal microscope with Zeiss Efficient Navigation (ZEN) software. A 100 mm×100 mm area was defined on the surface and of that area 5 sections of 4×4 mm were scanned. 16 single subfields were defined within the 4×4 mm zones, for each 1 mm² subfield the lowest valley level and highest hill level were defined. Within these vertical levels, pictures with e.g. 1 μm vertical (z-axis) separation were made, and a 3D profile was obtained.

Figure 5:
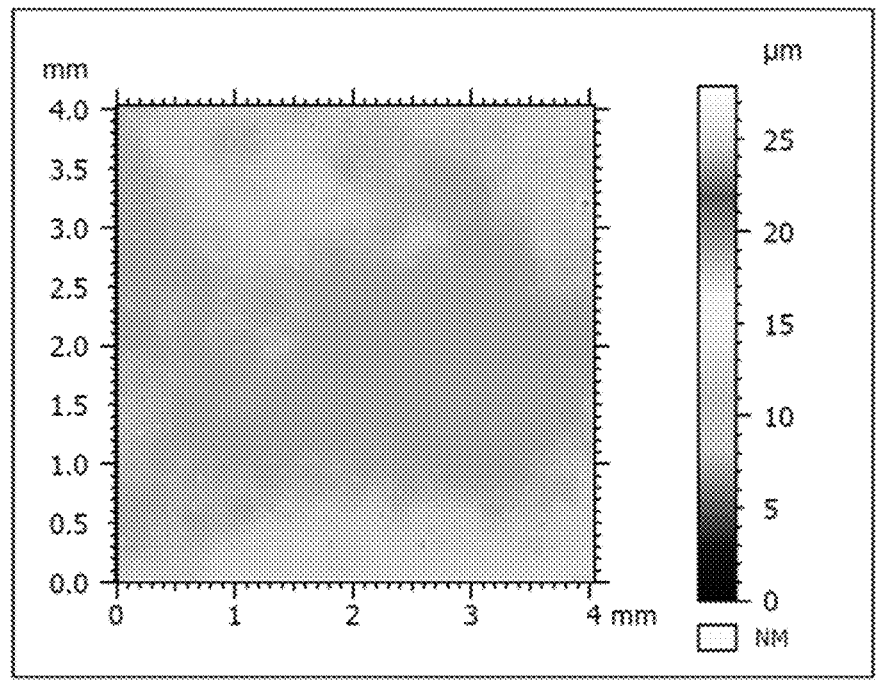
FIG. 5 shows a surface measurement for Article A prepared in the working examples.
Figure 6:
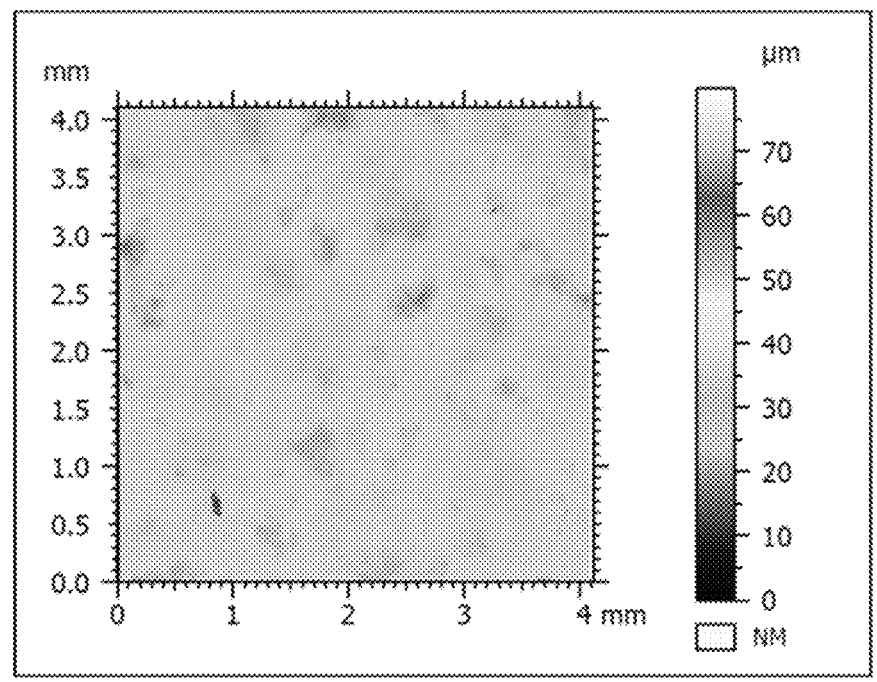
FIG. 6 shows a surface image for comparative coated article B.

FIG. 5 shows a surface measurement for article A. FIG. 6 shows a surface image for comparative coated article B. Table 2 gives the measured surface properties.

Figure 7:
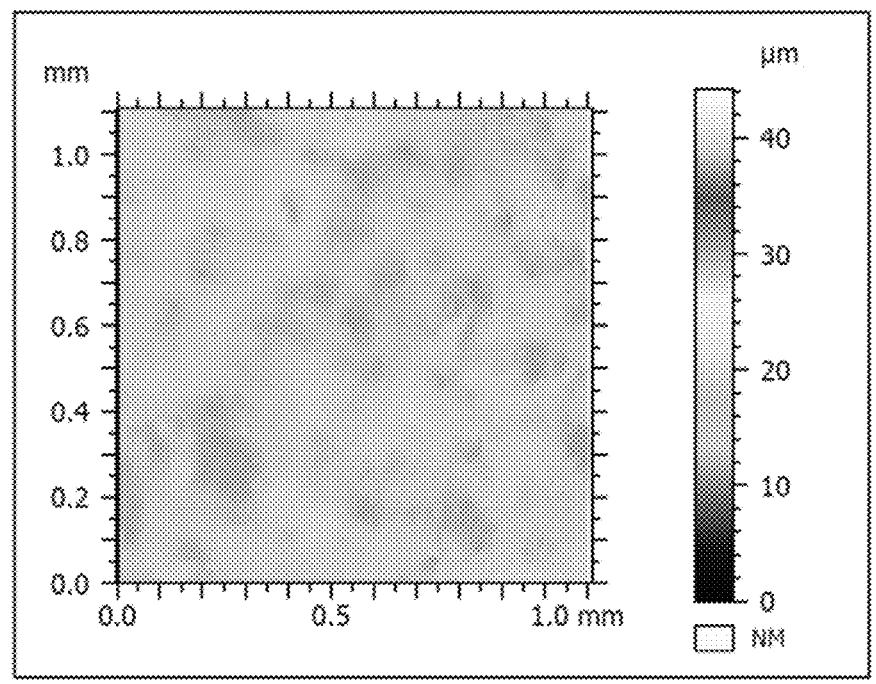
FIG. 7 shows a surface image for Article C prepared in the working examples.
Figure 8:
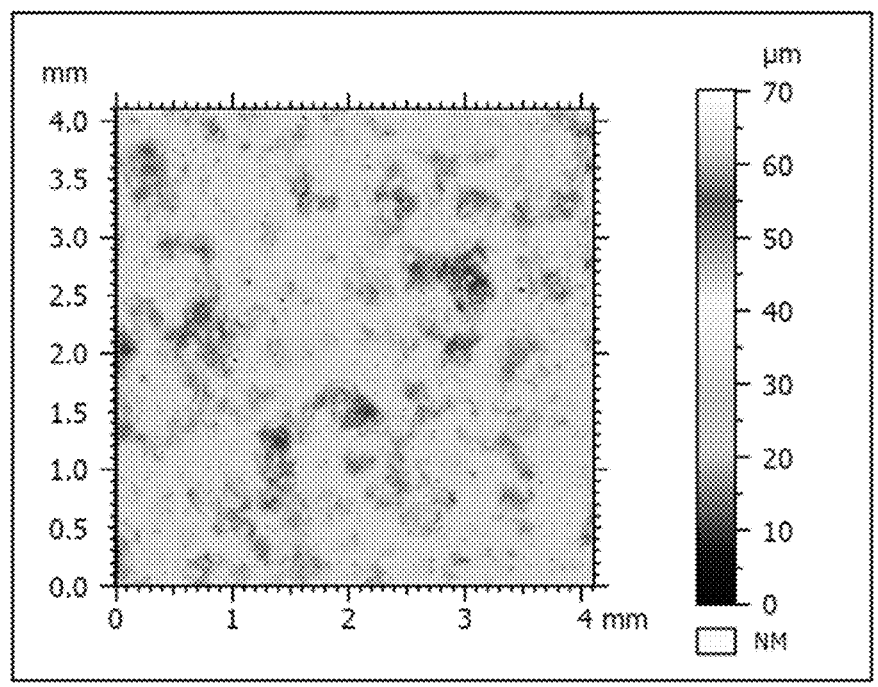
FIG. 8 shows a surface image for article D made in the working examples.

A coated article C was also prepared according to the invention with a first and a second layer, with a ULB powder coating. FIG. 7 shows a surface image for article C. A comparative coated article D was also prepared, with a single layer micro texture powder coating composition, the same as for the second layer of article C. FIG. 8 shows a surface image for article D. Table 2 indicates the surface properties for Coated Article C and comparative Coated Article D.

TABLE 2

|  | A (UV) | B (UV) (comparative) | C (ULB) | D (ULB) (comparative) |
| --- | --- | --- | --- | --- |
| Sq (μm) | 1.17 | 3.23 | 1.41 | 3.55 |
| Ssk | 0.31 | 0.28 | 0.53 | −0.66 |
| Sku | 6.04 | 6.04 | 5.71 | 6.82 |
| Sp (μm) | 15.07 | 35.30 | 21.89 | 28.17 |
| Sv (μm) | 12.81 | 44.54 | 22.33 | 42.05 |
| Sz (μm) | 27.88 | 79.84 | 44.22 | 70.22 |
| Sa (μm) | 0.92 | 2.51 | 1.08 | 2.71 |

Surface parameters according to ISO 25178.

Example 3

Example formulations are as follows:

| Formulation 1 | |
| --- | --- |
| ULB Basecoat: | ULB Topcoat: |
| Epoxy resin | Epoxy resin |
| Polyester resin | Polyester resin |
| Flow agent | Texturing agent |
| Waxes | Waxes |
| Pigments | Pigments |
| Fillers | Fillers |

| Formulation 2 | |
| --- | --- |
| UV Basecoat: | UV Topcoat: |
| Unsaturated polyester | Unsaturated polyester |
| Photoinitiator 1 | Photoinitiator 1 |
| Photoinitiator 2 | Photoinitiator 2 |
| Flow agent | Texturing agent |
| Pigments | Pigments |
| Fillers | Fillers |

| Formulation 3 | |
| --- | --- |
| ULB Basecoat: | UV Topcoat: |
| Epoxy resin | Unsaturated polyester |
| Polyester resin | Photoinitiator 1 |
| Flow agent | Photoinitiator 2 |
| Waxes | Texturing agent |
| Pigments | Pigments |
| Fillers | Fillers |

The preceding examples can be repeated with similar success by substituting the generically or specifically described reactants and/or operating conditions of this invention for those used in the preceding examples.

Note that in the specification and claims, "about" or "approximately" means within twenty percent (20%) of the numerical amount cited.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of powder coating an article, comprising:
a) providing a substrate coated with a first powder coating layer, and heating the first powder coating layer to a temperature of below 140° C. so as to at least partially melt or soften the first powder coating layer, such that the first powder coating layer is not or only partially cured;
b) applying a second powder coating layer on the first powder coating layer, the first powder coating layer being in a non-cured or only partially cured state,
c) curing the first powder coating layer and second powder coating layer by heating the substrate including the first and second powder coating layers to a temperature of below 140° C. or subjecting it to UV radiation,
wherein the material of the first powder coating layer comprises a flow agent so as to achieve a smooth powder coating layer, the term smooth defining a surface substantially free from irregularities, roughness or projections and the material of the second powder coating layer comprises a texturing agent so as to achieve a textured powder coating layer, the term textured defining a surface having varying degree of roughness and wherein the first powder coating layer and the second powder coating layer both are based on low-temperature curing powder coating compositions that cure at temperatures below 150° C., and
wherein the coating has a surface with a gloss valve of less than 40 gloss units measured at 60° C., and an average roughness Sa of less than 1.50 μm.

2. The method according claim 1, wherein the material of the second powder coating layers is UV curable, and wherein said curing step involves irradiation of the article with UV light for curing the second powder coating layer.

3. The method according to claim 2, wherein the materials of both the first and second powder coating layer are UV curable, and wherein said curing step involves irradiation of the article with UV light for curing the first and second powder coating layer, and wherein the first powder coating layer is not cured until after the second powder coating layer is applied.

4. The method according to claim 1, wherein the materials of both the first and second powder coating are ultra low bake powder coating materials.

5. The method according to claim 1, wherein the material of the second powder coating layer at least partly penetrates into the first layer.

6. The method according to claim 1, wherein in step a) the first layer is heated to a temperature of below 100° C. and wherein in step c) the substrate including the first and second layers is heated to a temperature of below 100° C. or subjected to UV irradiation.

7. The method according to claim 1, wherein the gloss of the obtained coating is adjusted by means of selecting the type of powder coating composition used in the second layer.

8. The method according to claim 1, wherein the flow agents comprise between 0.1 and 10% by weight based on the weight of the total powder coating formulation.

* * * * *